2,934,508

POLYMERIZABLE COMPOSITIONS AND RESINS MADE THEREFROM

Benjamin Phillips, Charleston, and Charles W. McGary, Jr., and Charles T. Patrick, Jr., South Charleston, W. Va., assignors to Union Carbide Corporation, a corporation of New York No Drawing. Application July 31, 1957
Serial No. 675,251

18 Claims. (Cl. 260—78.4)

This invention relates to polyepoxide compositions and, more particularly, to polymerizable diepoxide compositions and to resins made therefrom. It is directed to polymerizable compositions comprising dicyclopentadiene dioxide and polycarboxylic acid anhydrides, and to resins formed therefrom.

Our resins are water-resistant solids and can be made as hard, tough, infusible products which are insoluble in most organic solvents. They are hard and scratch resistant. These resins can be machined to desired shapes or configurations and can be polished to provide appealing finishes. They can be also made into articles having capabilities of sustaining greater loads at higher temperatures than other known polycarboxylic acid anhydride hardened epoxide resins. In accordance with our invention, resins having a combination of any of these useful properties can be produced.

Our polymerizable compositions range from room temperature solids to liquids and can be easily polymerized by maintaining the composition at an elevated temperature. The solid compositions are particularly valuable as molding materials and as laminating materials for such applications as preloading glass cloth. The preloaded glass cloth may then be laminated in the usual manner to produce glass laminates with outstanding strengths. By elevating the temperature of our solid compositions, low-viscosity, polymerizable, liquid compositions are obtained. These polymerizable liquid compositions have pot-lives of sufficient duration to permit the addition of fillers and pigments to alter the physical characteristics and appearance, respectively, of our resins. With or without fillers and pigments the liquid compositions are readily pourable and are capable of flowing into intricate corners of molds so that accurately molded articles result. The liquid compositions can be also flowed, sprayed or spread on surfaces and cured to provide durable, protective finishes thereto. Our polymerizable compositions whether liquid or solid, are also soluble in many organic solvents, such as, acetone, methyl isobutyl ketone, ethyl acetate, butyl acetate, toluene, xylene and the like.

Solutions thus formed can be flowed, sprayed or spread on surfaces, the solvent driven off and the composition cured to provide durable coatings. Our compositions can also be partially cured to solid resins, ground or granulated and employed as molding or laminating materials.

The polymerizable compositions of this invention can be advantageously made by mixing dicyclopentadiene dioxide with a polycarboxylic acid anhydride. Dicyclopentadiene dioxide is a crystalline solid which melts at about 184° C. and can be readily dissolved by many solvents including liquid polycarboxylic acid anhydrides at temperatures well below its melting point. The compositions can be prepared in any suitable manner as by mechanically mixing the liquid or granular forms of dicyclopentadiene dioxide with the liquid or granular forms of the polycarboxylic acid anhydride. It is preferred to form a homogeneous mixture of dicyclopentadiene dioxide and polycarboxylic acid anhydride prior to curing. When a polycarboxylic acid anhydride which is liquid at room temperature is employed, a homogeneous mixture can be advantageously obtained by mixing the anhydride and dicyclopentadiene dioxide at room temperature and elevating the temperature with stirring to a point where a solution is formed. When a solid polycarboxylic acid anhydride is used, it is advantageous first to melt either the anhydride or dicyclopentadiene dioxide whichever is lower melting and add the other thereto, stirring the mixture until a solution is formed. If needed, a further elevation of temperature will aid the formation of a solution. Temperatures required for forming a solution have been found to vary from 25° C. to 200° C. depending upon the particular polycarboxylic acid anhdride employed. Stirring aids the formation of a solution or homogeneous mixture, although it may not be necessary. After all of the composition components have been added, the solutions can be cooled to room temperatures and stored for future use, if desired, or used immediately. Granular or powdered dicyclopentadiene dioxide can be used also and when a solid polycarboxylic acid anhydride is employed the granular or powdered form thereof can be mechanically mixed with the granular or powdered form of dicyclopentadiene dioxide to produce a polymerizable composition which is particularly useful as a molding composition or a preloading composition for making glass laminates.

Catalysts in concentrations ranging up to about 10.0 weight percent based on the weight of dicyclopentadiene dioxide can be added at this point, at any time before curing or not at all, as desired. Catalysts have been found to be effective in increasing the rate of cure of our compositions. Catalyst concentrations higher than 10.0 weight percent are also effective, although concentration of 5.0 weight percent and below have been found to be adequate. Catalyst concentrations of 0.01 to 5.0 weight percent based on the weight of dicyclopentadiene dioxide are particularly preferred.

Our polymerizable compositions can also contain polycarboxylic acids which can be used to increase the curing rate and to modify properties, such as, rigidity, and hardness, of resins produced from such compositions. Polycarboxylic acid are preferably added with the polycarboxylic acid anhydrides to dicyclopentadiene dioxide or they can be added prior to or subsequent to the addition of said acid. Homogeneous compositions may be obtained in the manner already described or in any other suitable manner. Other polyfunctional materials can be incorporated into our compositions for developing special properties in our resins. Such polyfunctional materials include polyhydric phenols, other polyepoxides, e.g., polyglycidyl ethers of polyhydriphenols and the like, low-molecular weight melamine-formaldehyde, urea-formaldehyde or phenol-formaldehyde polymers and the like.

Curing can be carried out by maintaining the polymerizable compositions at temperatures from 50° C. to 300° C. The time required for effecting a complete cure can be made to vary from several minutes to several hours depending upon the curing temperature and whether a catalyst is used. A high curing temperature provides resins in less time than a low curing temperature and the presence of a catalyst will also shorten the curing time. It is advantageous, however, to heat the polymerizable composition at a temperature in the range from 50° C. to 150° C. to first effect a partial cure. A temperature from 100° C. to 300° C. then can be used to complete the cure. However, any one or combination of two or more temperatures within the above-specified range of 50° C. to 300° C. can be employed if desired, to effect a complete cure.

While not wishing to be held to any particular theory or mechanics of reaction, it is believed that in curing, one epoxy group of a dicyclopentadiene dioxide molecule can be difunctional when reacted with polycarboxylic acid anhydrides, such that, the equivalent of two carboxy groups of the anhydride can be thought of as reacting with a single epoxy group to form two ester linkages

interconnecting the epoxide molecule with the anhydride molecules. Disregarding the particular reaction steps or mechanism this reaction can be typified by the general equation:

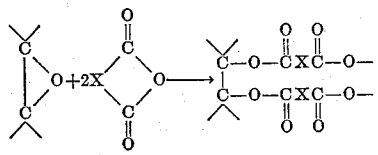

wherein

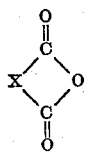

represents a polycarboxylic acid anhydride.

Although specific reaction steps or mechanisms are not shown by the equation, experimental analyses indicate that proton donating impurities present in the polymerizable compositions act as initiators for the reaction. Such proton donating impurities include water, alcohols, carboxylic acids and the like.

This reaction of polycarboxylic acid anhydrides with dicyclopentadiene dioxide is believed to provide cross-linking. It is also believed that resins obtained by using dicarboxylic anhydrides having fewer atoms in the shortest chain between the carbonyl groups of the oxydicarbonyl group are more rigid than those made with dicarboxylic anhydrides having more atoms in said shortest chain. Some degree of cross-linking is believed to be brought about by etherification of epoxy groups of different dicyclopentadiene dioxide molecules during curing, such as may be represented by the equation:

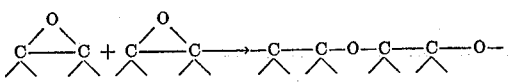

Similarly, it is believed that during curing, one epoxy group can be monofunctional when reacted with polycarboxylic acids, such that, one carboxy group of the acid reacts with a single epoxy group to form an ester linkage, i.e.,

interconnecting the acid molecule with the epoxide molecule and a hydroxyl group attached to said epoxide molecule. This reaction can be represented by the equation:

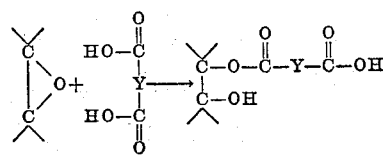

wherein

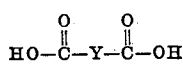

represents a polycarboxylic acid. A hydroxyl group such as that formed by this reaction and which is attached to the epoxide molecule is believed to be capable of reacting with an epoxy group, a carboxy group or an oxydicarbonyl group of a polycarboxylic acid anhydride to bring about cross-linking. By the use of polycarboxylic acids in our compositions, rigid resins, flexible resins or resins having intermediate degrees of flexibility or rigidity can be made, as desired. It is believed that compositions containing polycarboxylic acids tends to form more flexible resins than those not containing such polycarboxylic acids. Also, those compositions which contain polycarboxylic acids having a larger number of carboxy groups to the molecule form resins which tend to be more rigid than resins formed from compositions which contain polycarboxylic acids having fewer carboxy groups to the molecule. Resins obtained from compositions which contain dicarboxylic acids having greater numbers of atoms in the shortest chain connecting the carboxy groups are believed to have a greater degree of flexibility than resins made from compositions containing dicarboxylic acids having fewer atoms in the shortest chain connecting the carboxy groups. It is possible, therefore, to produce resins of different degrees of flexibility and rigidity to suit a large variety of particular needs.

Our resins can be made as infusible products which are water-resistant and insoluble in many organic solvents. As an illustration, these thermoset resins can be made from compositions containing dicyclopentadiene dioxide, polycarboxylic acid anhydrides in amounts having $x$ carboxy equivalents for each epoxy equivalent, and polycarboxylic acids in amounts having $y$ carboxy equivalents for each epoxy equivalent, wherein, $x$ is a number from 0.5 to 3.0, $y$ is a number from 0.0 to 1.0, the sum of $x$ and $y$ is not greater than 3.0 and the ratio of $x/y$ is at least equal to one. By the term "carboxy equivalent," as used herein, with regard to polycarboxylic acid anhydrides, it meant the number of moles of carboxy groups, —COOH, which would be contained by an amount of the hydrated anhydride, e.g., one mole of phthalic anhydride is considered to have 2 carboxy equivalents. When applied to polycarboxylic acids, the term "carboxy equivalent," as used herein, is means to indicate the number of moles of carboxy groups, —COOH, contained by an amount of polycarboxylic acid, for example, one mole of a dicarboxylic acid contains 2 carboxy equivalents. By the term, "epoxy equivalent," as used herein, is meant the number of moles of epoxy groups

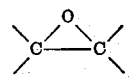

contained by an amount of dicyclopentadiene dioxide. In determining the value of $x/y$ in the case where the denominator, $y$, may be zero, the quotient of $x/y$, as used herein, is taken to be equal to infinity or a number greater than one.

Hard, infusible resins having high heat distortion values also can be obtained by curing our polymerizable compositions. Illustratively, our polymerizable compositions can be made from dicyclopentadiene dioxide, polycarboxylic acid anhydrides in amounts containing $x$ carboxy equivalents for each epoxy equivalent, and polycarboxylic acids in amounts containing $y$ carboxy equivalents for each epoxy equivalent, wherein $x$ is a number from 1.0 to 2.0, $y$ is a number from 0.0 to 1.0, the sum of $x$ and $y$ is not greater than 2.0 and the ratio $x/y$ is at least equal to one. These polymerizable compositions can be cured to hard, infusible resins having high heat distortion values.

Our resins can be characterized as having recurring interconnected units represented by the following formula:

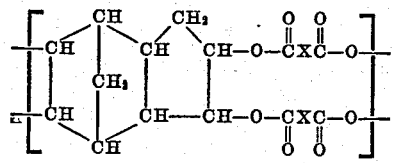

wherein, X represents a polycarboxylic acid anhydride residue. By the term, "polycarboxylic acid anhydride residue," as used herein is meant a polyvalent group which can be regarded as the residue of a polycarboxylic acid anhydride molecule to which one, or more than one, oxydicarbonyl group of the formula

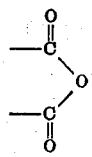

is attached to constitute said polycarboxylic acid anhydride molecule. Thus, a dicarboxylic acid anhydride molecule consists of the divalent group of the dicarboxylic acid anhydride residue to which one oxydicarbonyl group, as shown above, is attached.

Dicyclopentadiene dioxide is a diepoxide having the formula:

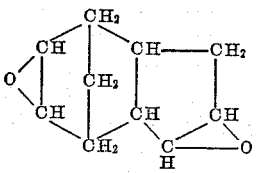

This diepoxide can be made by epoxidizing dicyclopentadiene with a suitable epoxidizing agent. Suitable epoxidizing agents include organic peracids, e.g., peracetic acid, and aldehyde monoperacylates, e.g., acetaldehyde monoperacetate. The epoxidation reaction can be advantageously carried out by charging dicyclopentadiene to a reaction vessel and then gradually adding the epoxidizing agent. In order to provide ease of handling and to avoid the formation of highly concentrated or crystalline peracetic acid with its attendant explosion hazard, the epoxidizing agent preferably is employed in a solvent, as for example, acetone, chloroform, methylethyl ketone, ethyl acetate, butyl acetate, and the like. The reaction can be carried out at a temperature within the range of about −25° C. to 150° C., although lower and higher temperatures may be used. However, longer reaction times are needed at the lower temperatures to produce high yields. At the higher temperatures, yields of diepoxide tend to be low because side reactions form undesirable materials. However, these undesirable materials can be removed by conventional purification procedures, such as, fractional distillation. The reaction is continued until an analysis for epoxidizing agent indicates that an amount at least sufficient to epoxidize all the double bonds of the dicyclopentadiene has been consumed. In this connection it is desirable to employ an excess over the theoretical amount of peracetic acid to assure complete epoxidation. Upon discontinuance of the reaction, side-reaction products, solvent and unreacted material are removed by any convenient procedure, such as, by adding a potboiler, e.g., ethylbenzene, and stripping low-boiling materials. A solid residual product identified as dicyclopentadiene dioxide, is obtained. This product melts at about 184° C.

Polycarboxylic acid anhydrides useful in producing our resins can be represented by the formula:

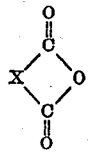

wherein X represents two or more carbon atoms interconnected by single or double bonds and to which such groups as hydrogen, alkyl, nitro, chloro, iodo, bromo, cyclic groups and the like or combinations thereof may be attached. X can also represent groups containing carbon atoms interconnected by single or double bonds and oxydicarboxyl groups, i.e.

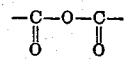

interconnecting the carbon atom groups to which such other groups as previously mentioned may be attached. X may also represent such cyclic groups as phenylene, cyclohexylene, cyclohexenylene, and the like which may have one or more oxydicarbonyl groups attached thereto. Polycarboxylic acid anhydrides, containing other groups not specifically mentioned herein, and not taking part in the curing reaction may be used in our polymerizable compositions without harmful effects, and, in fact, may be used to develop particular properties in our resins. One polycarboxylic acid anhydride or a mixture of two or more, as desired, can be used in our polymerizable compositions.

Typical polycarboxylic acid anhydrides include succinic anhydride, glutaric anhydride, propylsuccinic anhydride, methylbutylsuccinic anhydride, hexylsuccinic anhydride, heptylsuccinic anhydride, pentenylsuccinic anhydride, octenylsuccinic anhydride, nonenylsuccinic anhydride, alpha, betadiethylsuccinic anhydride, maleic anhydride, chloromaleic anhydride, dichloromaleic anhydride, itaconic anhydride, citraconic anhydride, hexahydrophthalic anhydride, hexachlorphthalic anhydride, tetrahydrophthalic anhydride, methyltetrahydrophthalic anhydride, tetrachlorphthalic anhydride; hexachloroendomethylenetetrahydrophthalic anhydride, hereinafter referred to as chlorendic anhydride, tetrabromophthalic anhydride, tetraiodophthalic anhydride; phthalic anhydride, 4-nitrophthalic anhydride, 1,2-naphthalic anhydride, 1,8-naphthalic anhydride, 2,3-naphthalic anhydride; 1,2,4,5-benzenetetracarboxylic dianhydride; polymeric dicarboxylic acid anhydrides, or mixed polymeric dicarboxylic acid anhydrides such as those prepared by the autocondensation of dicarboxylic acids, for examples, adipic acid, pimelic acid, sebacic acid, hexahydroisophthalic acid, terephthalic acid, isophthalic acid, and the like. Also, other dicarboxylic acid anhydrides, useful in our polymerizable compositions, include the Diels-Adler adducts of maleic acid and aliphatic compounds having conjugated double bonds. Preferred polycarboxylic acid anhydrides are those which dissolve or are soluble in dicyclopentadiene dioxide at temperatures below about 250° C.

Polycarboxylic acids which can be used in our compositions are compounds containing two or more carboxy groups to the molecule. Typical polycarboxylic acids can be represented by the formula:

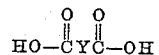

Y can represent a single bond or a divalent group composed of one carbon atom or groups of carbon atoms interconnected by single or multiple bonds, and to which such groups as hydrogen, alkyl, carboxy, chloro, bromo, amino, cyclic groups and the like or combinations thereof can be attached. Y can also represent a divalent group containing groups of carbon atoms interconnected by single or multiple bonds and ester linkages, i.e.

$$-\underset{\underset{O}{\parallel}}{C}O-$$

or such other atoms as oxygen, sulfur or nitrogen atoms, interconnecting the carbon atom groups to which such other groups as previously mentioned may be attached. Y may represent cyclic groups, such as, phenylene, cyclohexylene, cyclohexenylene and the like. Polycarboxylic acids containing other groups not specifically mentioned herein and not participating in the curing reaction can be used in producing our polyesters and, in fact, can be particularly useful in developing special properties in our resins. Mixtures of polycarboxylic acids, or only one polycarboxylic acid, as desired, can be used in making our resins.

Representative polycarboxylic acids include oxalic acid, malonic acid, succinic acid, glutaric acid, adipic acid, pimeli acid, suberic acid, azelaic acid, sebacic acid, alkylsuccinic acids, alkenylsuccinic acids, ethylbutenylsuccinic acid, maleic acid, fumaric acid, itaconi acid, citraconic acid, mesaconic acid, glutaconic acid, ethylidenemalonic acid, isopropylidenemalonic acid, allylmalonic acid, muconic acid, alpha-hydromuconic acid, beta-hydromuconic acid, diglycolic acid, dilactic acid, dithioglycolic acid, 4-amyl-2,5-heptadienedioic acid, 3-hexynedioic acid, 4,6-decadiynedioic acid, 2,4,6,8-decatetraenedioic acid, 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, tetrahydrophthalic acid, tetrachlorphthalic acid, 1,8-naphthalenedicarboxylic acid, 3-carboxycinnamic acid, 1,2-naphthalenedicarboxylic acid, 1,1,5-pentanetricarboxylic acid, 1,2,4-hexanetricarboxylic acid, 2-propyl-1,2,4-pentanetricarboxylic acid, 5-octene-3,3,6-tricarboxylic acid, 1,2,3-propanetricarboxylic acid, 1,2,4-benzenetricarboxylic acid, 1,3,5-benzenetricarboxylic acid, 3-hexene-2,2,3,4-tetracarboxylic acid, 1,2,3,4-benzenetetracarboxylic acid, 1,2,3,5-benzenetetracarboxylic acid, 1,2,4,5-benzenetetracarboxylic acid, benzenepentacarboxylic acid, benzenehexacarboxylic acid and the like.

Also as polycarboxylic acids useful in our polymerizable compositions are included compounds containing ester groups, two or more carboxy groups and which can be aptly termed polycarboxy polyesters of polycarboxylic acids, such as those listed above, or the corresponding anhydrides of said acids, with polyhydric alcohols. By the term "polycarboxy polyesters," as used herein, is meant polyesters containing two or more carboxy groups per molecule. These polycarboxy polyesters can be prepared by known condensation procedures, employing mole ratios favoring greater than equivalent amounts of polycarboxylic acid, or anhydride. More specifically, the amount of polycarboxylic acid, or anhydride, employed in the esterification reaction should contain more carboxy groups than are required to react with the hydroxyl groups of the amount of polyhydric reactant. Polyhydric alcohols which can be employed in preparing these polycarboxy polyesters include dihydric alcohols, such as ethylene glycol, diethylene glycol, triethylene glycol, tetraethylene glycol, 1,2-propylene glycol, 1,3-propylene glycol, dipropylene glycols, tripropylene glycols, polyoxyethylene glycols, polyoxypropylene glycols, 1,2-butylene glycol, 1,4-butylene glycol, pentane-1,5-diol, pentane-2,4-diol, 2,2-dimethyltrimethylene glycol, hexane-1,4-diol, hexane-1,5-diol, hexane-1,6-diol, hexane-2,5-diol, 3-methylpentane-1,5-diol, 2-methylpentane-2,5-diol, 3-methylpentane-2,5-diol, 2,2-diethylpropane-1,3-diol, 2-ethylhexane-1,3-diol, 2,5-dimethylhexane-2,5-diol, octadecane-1,12-diol, 1-butene-3,4-diol, 2-butene-1,4-diol, 2-butyne-1,4-diol, 2,5-dimethyl-3-hexyne-2,5-diol, and the like; trihydric compounds such as glycerol, trimethylolmethane, hexane-1,2,6-triol, 1,1,1-trimethylolpropane, and the like; tetrahydric compounds, such as pentaerythritol, diglycerol, and the like; and higher polyhydric compounds such as pentaglycerol, dipentaerythritol, polyvinyl alcohols and the like. Additional polyhydric alcohols useful in making polycarboxy polyesters can be prepared by the reaction of epoxides, e.g., diglycidyl ethers of 2,2-propane bis-phenol, and reactive hydrogen-containing organic compounds, e.g., amines, polycarboxylic acids, polyhydric compounds and the like. In forming the polycarboxy polyesters that can be employed in the compositions of this invention it is preferable to use a dihydric, trihydric or tetrahydric aliphatic or oxaaliphatic alcohol. The mole ratios in which the polycarboxylic acid or anhydride can be reacted with polyhydric alcohols in preparing polycarboxylic polyesters useful in our compositions are those which provide polyesters having more than one carboxy group per molecule. In the case of trifunctional and tetrafunctional reactants in the esterification reaction, the mole ratios of the respective reactants must be such as to avert gelation. The preferred mole ratio ranges of dicarboxylic acid to trihydric or tetrahydric alcohols that have been found to provide polycarboxylic polyesters which preferably can be used in the compositions of this invention are presented in Table I.

TABLE I

| Polyhydric Alcohol | Mole Ratio of Dicarboxylic Acid or Anhydride to Polyhydric Alcohols |
| --- | --- |
| Trihydric Alcohol | 2.2 to 3.0 |
| Tetrahydric Alcohol | 3.3 to 4.0 |

It is particularly preferred, however, to employ polycarboxylic polyesters prepared from dicarboxylic acids or anhydrides and polyhydric alcohols in the mole ratios specified in Table II.

TABLE II

| Polyhydric Alcohol | Mole Ratio of Dicarboxylic Acid or Anhydride to Polyhydric Alcohols |
| --- | --- |
| Trihydric Alcohol | 2.5 to 3.0 |
| Tetrahydric Alcohol | 3.5 to 4.0 |

These polycarboxy polyesters can be obtained by condensing, in accordance with known procedures, a polyhydric alcohol and a polycarboxylic acid or anhydride. This condensation reaction may be conducted, for example, by heating the reactants to a temperature within the range from 100° C. to 200° C. with or without an acidic catalyst. Water formed by the condensation reaction may be removed by distillation. The course of the reaction may be followed by making acid number determinations and the reaction can be stopped when a suitable polycarboxy polyester has been obtained.

As preferred polycarboxylic acids, those which dissolve or are soluble in dicyclopentadiene dioxide below about 250° C. are advantageously employed.

Catalysts which can be employed with advantageous effects in speeding the cure of our resins are the acidic and basic catalysts including mineral acids, metal halide Lewis acids and strongly basic compounds. Representative of mineral acids which can be used in speeding the formation of our resins are sulfuric acid, perchloric acid, polyphosphoric acid and the various sulfonic acids, such as, toluene sulfonic acid, benzene sulfonic acid and the like. Metal halide Lewis acids which are also effective in speeding the cure of our resins include borontrifluoride, stannic chloride, zinc chloride, aluminum chloride, ferric chloride and the like. The metal halide Lewis acid catalysts can also be used in the form of such complexes as etherate complexes and amine complexes, for example, borontrifluoride - piperidine and borontrifluoride - monoethylamine complexes. In the form of a complex, the metal halide Lewis acid catalyst is believed to remain substantially inactive until released as by dissociation of the complex upon increasing the temperature. When released from the complex, the catalyst then exerts its catalytic effect. Typical of the basic catalysts which can be employed are the alkali metal hydroxides, e.g., sodium hydroxide, potassium hydroxide, and the like; and quaternary ammonium compounds, e.g., benzoyl ammonium hydroxide and the like; and tertiary amines, e.g., benzyl-dimethylamine, dimethylamino-methyl phenol and the like.

Uniform dispersions of catalyst in our polymerizable compositions prior to curing has been found to be desirable in order to obtain homogeneous resins and to minimize localized curing around catalyst particles. Agitation of the polymerizable compositions containing catalyst is adequate when the catalyst is miscible with said compositions. When the two are immiscible, the catalyst can be added in a solvent. Typical solvents for the catalysts include organic ethers, e.g., diethyl ether, dipropyl ether, 2-methoxy-1-propanol, organic esters, e.g., methyl acetate, ethyl acetate, ethylpropionate, organic ketones, e.g., acetone, methylisobutylketone, cyclohexanone, organic alcohols, e.g., methanol, cyclohexanol propylene glycol and the like. The mineral acids can be employed as solutions in water, whereas metal halide Lewis acid catalysts tend to decompose in water and aqueous solutions of such Lewis acids are not preferred.

Our polymerizable compositions can be used in coatings, castings, moldings, bondings, laminates and the like in the manufacture of articles having a multitude of uses. These compositions can be colored by pigments and very appealing appearances may be imparted to articles made therefrom. Fillers can also be incorporated in our compositions so as to impart special properties to articles manufactured therefrom. Such sundry articles as buttons, combs, brush handles, structural parts for instrument cabinets and the like can be formed through the use of our polymerizable compositions and resins. Of particular importance, are uses of our hard, tough resins of high heat distortion values in industrial applications wherein load carrying capabilities at high temperatures are required. Uses of this kind include hot fluid carrying conduits, high temperature tools and dies, minor structural parts and high temperature electrical insulation for high-speed aircraft and the like.

The following examples are presented.

In these examples "parts" designates parts by weight. Barcol hardness values were obtained by the use of a Barcol Impressor GYZJ–934–1 and heat distortion values and Izod impact values were determined in accordance with ASTM methods D–648–45T and D–256–47T, respectively. Unless otherwise specified room temperatures are temperatures within 20° C. to 30° C. range.

*Example 1*

A mixture containing 164 parts of dicyclopentadiene dioxide and 98 parts of maleic anhydride was prepared. The mixture contained equimolar amounts of diepoxide and anhydride. The mixture was heated until it became homogeneous (at a temperature of 80° C.). The homogeneous mixture was maintained at 160° C. for 7.4 hours during the first 1.4 hours of which a gel was formed. A dark brown, infusible resin having a Barcol hardness of 40 was obtained.

*Example 2*

A mixture containing 164 parts of dicyclopentadiene dioxide and 100 parts of succinic anhydride was prepared. This mixture contained equimolar proportions of diepoxide and anhydride. The mixture was then heated until a homogeneous melt was obtained (occurring at a temperature of about 120° C.). The homogeneous melt was maintained at 160° C. for 15.7 hours during the first 9.7 of which a gel was formed. A tough, infusible, brown-colored resin having a Barcol hardness of 45 was obtained at the end of 15.7 hours at 160° C.

*Example 3*

A mixture containing 158 parts of dicyclopentadiene dioxide, 142 parts of phthalic anhydride and 0.04 weight percent of potassium hydroxide in an ethanol solution as catalyst was prepared. The molar ratio of anhydride to diepoxide contained by the mixture was one to one. The mixture thus prepared was heated to a temperature of about 120° C. whereupon a homogeneous melt was formed. The melt was heated at 160° C. for 11 hours during the first five hours of which a gel was formed. At the end of 11 hours at 160° C. an infusible resin having a heat distortion point of 196° C., an Izod impact of 0.1 ft. lbs./in. of notch, and a Barcol hardness of 46 was obtained.

*Example 4*

A mixture containing 164 parts of dicyclopentadiene dioxide and 128 parts of polyadipic anhydride was prepared and heated to a temperature of about 100° C. whereupon a homogeneous melt was formed. This melt contained equimolar amounts of diepoxide and anhydride. The melt was then held at 160° C. for 8.9 hours during which time a gel was formed. This gel was maintained at 160° C. for an additional 6 hours and a brown, infusible, hard resin was obtained.

*Examples 5 through 13*

Nine mixtures were prepared from dicyclopentadiene dioxide and phthalic anhydride. Each mixture contained 164 parts of dicyclopentadiene dioxide and the respective amounts of phthalic anhydride as listed in Table I below. Each mixture contained the mole ratios of anhyride to diepoxide as correspondingly listed in the table below. The mixtures were then maintained at 160° C. until gels were formed. Gels formed from the mixtures of Examples 6 through 13 in the times correspondingly listed in the table. No gel formed from the mixture of Example 5. The gels were then cured for 6 hours at 160° C. Brown, infusible resins having the properties listed in the table below were obtained from the mixtures of Examples 6 through 13. However, a liquid resin was obtained from the mixture of Example 5.

TABLE I

| Example Number | Parts of Phthalic Anhydride | Mole Ratio of Anhydride/ diepoxide | Gel Time (Hours) | Resin Properties |
|---|---|---|---|---|
| 5 | 45 | 0.3 | No gel | Liquid. |
| 6 | 74 | 0.5 | 10.3 | Hard. |
| 7 | 148 | 1.0 | 5.4 | Hard, Barcol hardness—52. |
| 8 | 185 | 1.25 | 5.3 | Hard, Barcol hardness—45. |
| 9 | 222 | 1.5 | 5.0 | Hard, Barcol hardness—42. |
| 10 | 260 | 1.75 | 5.2 | Hard, Barcol hardness—37. |
| 11 | 296 | 2.0 | 6.2 | Hard, Barcol hardness—40. |
| 12 | 370 | 2.5 | 6.1 | Hard, Barcol hardness—30. |
| 13 | 444 | 3.0 | 7.1 | Tough, Barcol hardness—0. |

*Examples 14 through 20*

Six mixtures, each containing 82 parts of dicyclopentadiene dioxide and 74 parts of phthalic anhydride were prepared. These mixtures all contained equimolar amounts of diepoxide and anhydride. To the mixtures of Examples 14 through 19 different catalysts correspondingly identified in Table II below were added as solutions in solvents also correspondingly identified in the table below. Each mixture, thus obtained, contained catalysts concentrations based on the weight of which are correspondingly listed in the table below. All six mixtures and an additional 84 parts sample of dicyclopentadiene dioxide containing no catalyst for purposes of comparison were heated at 160° C. until gels were formed. The times respectively required for forming gels are correspondingly listed in Table II.

TABLE II

| Example Number | Catalyst | Solvent | Catalyst Concentration (weight percent) | Gel Time (Hours) |
|---|---|---|---|---|
| 14 | Potassium Hydroxide | Methanol | 0.05 | 1.5 |
| 15 | Dimethylbenzylamine | Ethyl Acetate | 0.60 | 7.6 |
| 16 | Zinc Chloride | do | 0.05 | 1.6 |
| 17 | Stannic Chloride | do | 0.05 | 2.0 |
| 18 | Sulfuric Acid | Diethyl Ether | 0.20 | 4.8 |
| 19 | Phosphoric Acid | do | 0.20 | 7.7 |
| 20 | Control | | | 8.2 |

*Example 21*

A mixture containing 189 parts of dicyclopentadiene dioxide, 128 parts of phthalic anhydride and 33 parts of adipic acid was prepared. This mixture contained 0.75 mole of anhydride and 0.2 mole of the acid for each mole of the diepoxide. The resulting mixture was heated to a temperature of about 120° C. whereupon a homogeneous melt was formed. This melt was maintained at 120° C. for 3 hours during which time a gel was formed. This gel was cured for 6 hours at a temperature of 160° C. and an infusible resin having a heat distortion point of 214° C., an Izod impact of 0.1 ft. lbs./in. of notch, and a Barcol hardness of 41 was obtained.

*Example 22*

A mixture containing 194 parts of dicyclopentadiene dioxide, 88 parts of phthalic anhydride and 69 parts of adipic acid was prepared. This mixture contained 0.5 mole of the anhydride and 0.4 mole of the acid for each mole of the diepoxide. The mixture was heated to a temperature of about 120° C. whereupon a homogeneous melt was obtained. The melt then was held at 120° C. for 2 hours during which time a gel was formed. This gel was held at 160° C. for an additional 6 hours after which time an infusible resin having a heat distortion point of 181° C., an Izod impact of 0.2 ft. lbs./in. of notch, and a Barcol hardness of 46 was obtained.

*Example 23*

A 23.1 weight percent solution (1085 grams) of peracetic acid in ethyl acetate was added dropwise with stirring to 198 grams of dicyclopentadiene at 40° C. During the 1⅔ hours required for the addition the temperature was maintained at 40° C. by cooling when necessary. After an additional 4 hour reaction period an analysis for peracetic acid indicated that the reaction was completed. The reaction mixture was diluted with 1 liter of ethylbenzene and the ethyl acetate, acetic acid, and part of the ethylbenzene were removed on a still column under reduced pressure. After removal of all of the acetic acid the product solution in ethylbenzene was cooled to $-10°$ C. The crystalline dicyclopentadiene dioxide was removed by filtration. A 123 gram yield of dicyclopentadiene dioxide having a melting point of 183 to 185° C. was obtained. By reducing the filtrate volume two additional cuts of crystalline product were obtained totaling 95 grams and having a melting point range of 178 to 181° C. The yield, based on the dicyclopentadiene charged, was 88.7 percent of the theoretical.

What is claimed is:

1. A polymerizable composition comprising dicyclopentadiene dioxide and a polycarboxylic acid anhydride in such relative amounts as provide from 0.5 to 3.0 carboxy equivalents of the anhydride for each epoxy equivalent of the dioxide.

2. A polymerizable composition comprising dicyclopentadiene dioxide and a polycarboxylic acid anhydride in such relative amounts as provide from 1.0 to 2.0 carboxy equivalents of the anhydride for each epoxy equivalent of the dioxide.

3. A polymerizable composition comprising dicyclopentadiene dioxide, a polycarboxylic acid anhydride in such an amount as provides $x$ carboxy equivalents for each epoxy equivalent and a polycarboxylic acid in such an amount as provides $y$ carboxy equivalents for each epoxy equivalent, wherein $x$ is a number from 0.5 to 3.0, $y$ is a number from 0.0 to 1.0, the sum of $x$ and $y$ is not greater than 3.0 and the ratio of $x/y$ is at least equal to one.

4. A polymerizable composition comprising dicyclopentadiene dioxide, a polycarboxylic acid anhydride in such an amount as provides $x$ carboxy equivalents for each epoxy equivalent and a polycarboxylic acid in such an amount as provides $y$ carboxy equivalents for each epoxy equivalent wherein $x$ is a number from 1.0 to 2.0, $y$ is a number from 0.0 to 1.0, the sum of $x$ and $y$ is not greater than 2.0 and the ratio of $x/y$ is at least equal to one.

5. A polymerizable composition as claimed in claim 1 wherein the polycarboxylic acid anhydride is maleic anhydride.

6. A polymerizable composition as claimed in claim 1 wherein the polycarboxylic acid anhydride is succinic anhydride.

7. A polymerizable composition as claimed in claim 1 wherein the polycarboxylic acid anhydride is phthalic anhydride.

8. A polymerizable composition as claimed in claim 1 wherein the polycarboxylic acid anhydride is polyadipic anhydride.

9. A polymerizable composition as claimed in claim 3 wherein the polycarboxylic acid anhydride is phthalic anhydride and the polycarboxylic acid is adipic acid.

10. A polymerizable composition as claimed in claim 3 wherein the polycarboxylic acid anhydride is phthalic anhydride and the polycarboxylic acid is succinic acid.

11. A polymerizable composition comprising equimolar amounts of dicyclopentadiene dioxide and maleic anhydride.

12. A polymerizable composition comprising equimolar amounts of dicyclopentadiene dioxide and succinic anhydride.

13. A polymerizable composition comprising equimolar amounts of dicyclopentadiene dioxide and phthalic anhydride.

14. A polymerizable composition comprising equimolar amounts of dicyclopentadiene dioxide and polyadipic anhydride.

15. A polymerizable composition comprising dicyclopentadiene dioxide, phthalic anhydride and adipic acid in such relative amounts as provide 0.75 carboxy equivalent of the anhydride and 0.2 carboxy equivalent of the acid for each epoxy equivalent of the dioxide.

16. Resins obtained by heating the polymerizable composition claimed in claim 3.

17. Resins obtained by heating the polymerizable composition claimed in claim 9.

18. Resins obtained by heating the polymerizable composition claimed in claim 10.

(References on following page)

References Cited in the file of this patent

UNITED STATES PATENTS

| | | |
|---|---|---|
| 2,527,806 | Foster | Oct. 31, 1950 |
| 2,623,023 | Koroly | Dec. 23, 1952 |
| 2,712,535 | Fisch | July 5, 1955 |
| 2,720,500 | Cody | Oct. 11, 1955 |
| 2,764,575 | Kohler et al. | Sept. 25, 1956 |
| 2,768,153 | Shokal | Oct. 23, 1956 |

FOREIGN PATENTS

| | | |
|---|---|---|
| 187,900 | Australia | Dec. 10, 1956 |

OTHER REFERENCES

Grant: Hackh's Chemical Dictionary, 3rd edition (1944), page 270, "Dicyclopentadiene." (Copy in Scientific Library.)